May 8, 1934.  J. A. BOLAND  1,958,262
VALVE
Filed Aug. 19, 1932   4 Sheets-Sheet 1

WITNESSES
J. E. Dickinson
J. R. Langley

INVENTOR.
Jerome A. Boland
BY Brown, Critchlow & Flick
his ATTORNEYS

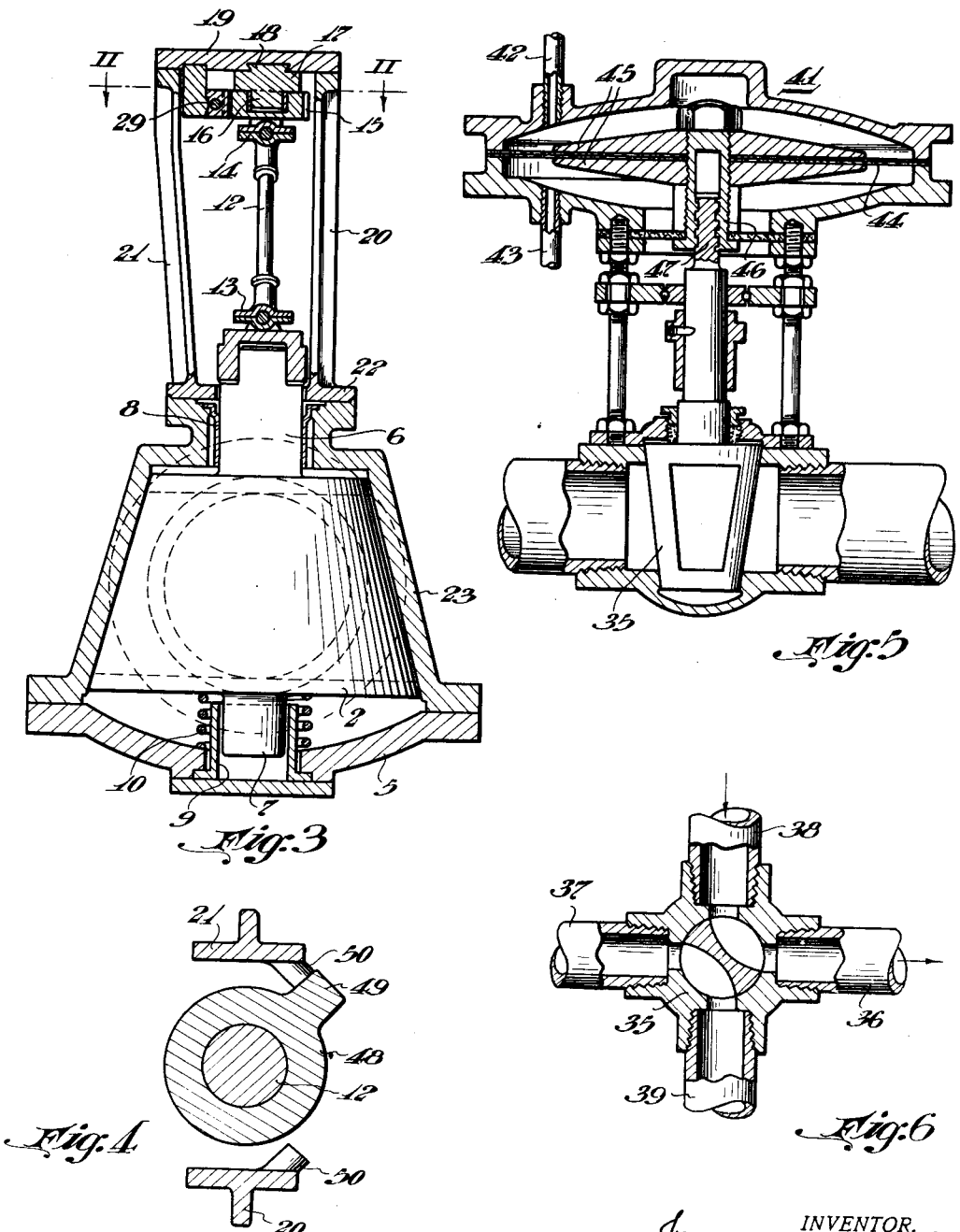

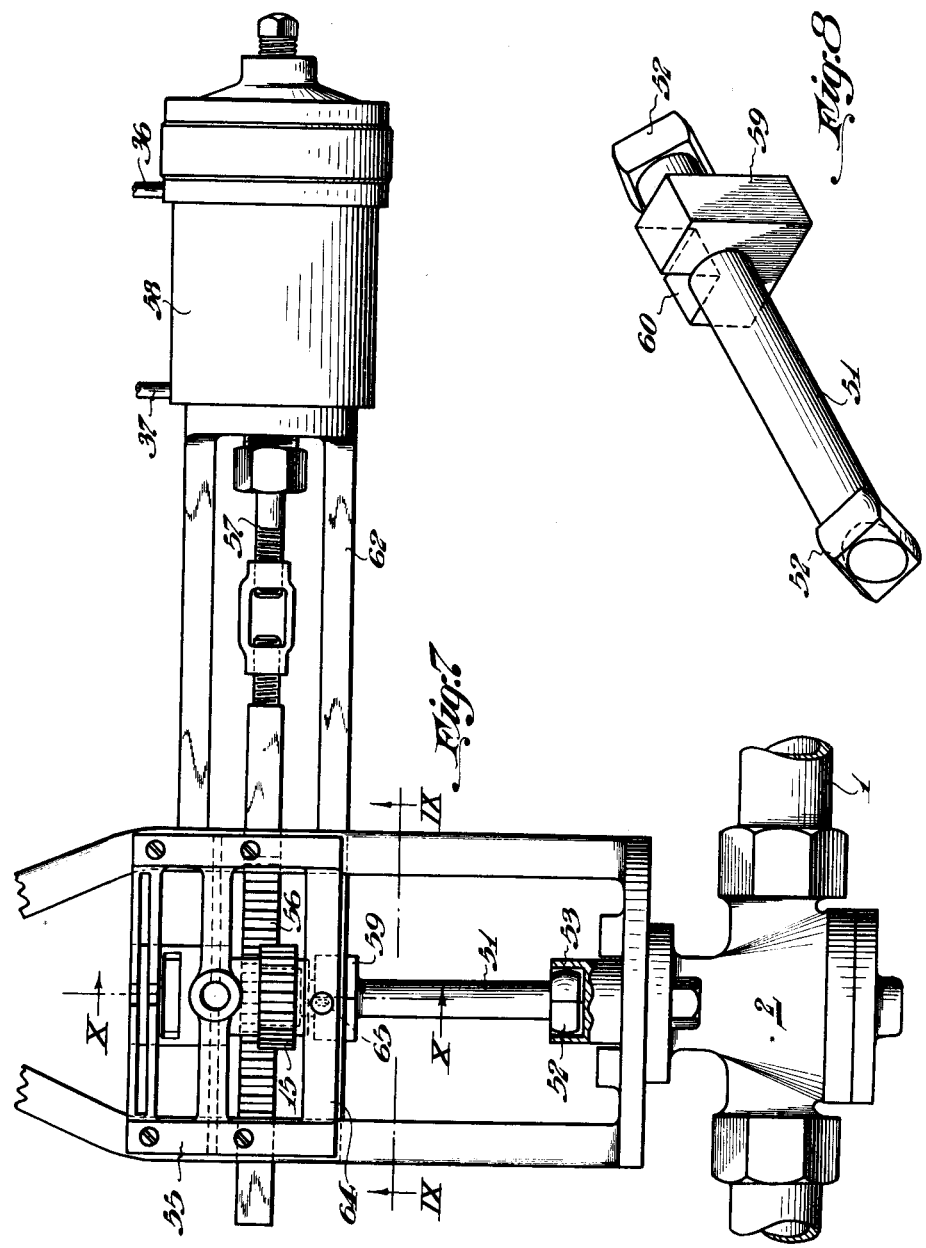

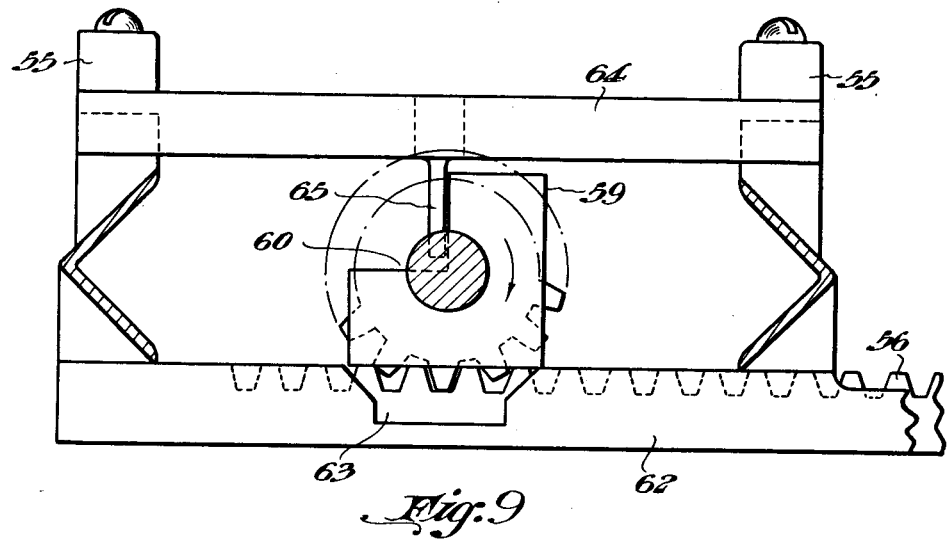
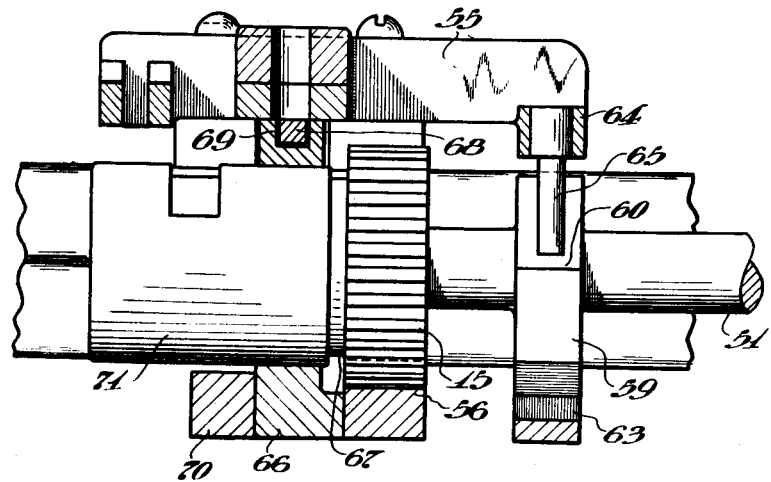

Patented May 8, 1934

1,958,262

UNITED STATES PATENT OFFICE 1,958,262

VALVE

Jerome A. Boland, Belle Vernon, Pa.

Application August 19, 1932, Serial No. 629,465

8 Claims. (Cl. 251—97)

My invention relates to valves and particularly to valves of the plug type that are automatically removed from their seats while they are actuated to and from their open and closed positions.

It is an object of my invention to provide a valve of the character described above having simple and effective operating mechanism therefor for successively removing said valve from its seat, rotating it to its desired position, and then returning the valve to its seat.

In the operation of plug valves for controlling the flow of liquids or gases, such for example as water for a turbine or other power device, it is desirable that the valve be tightly seated in either its closed or its open position. It is desirable also that the valve be released from its seat during its rotation from one position to the other in order that relatively little power be required for its operation and in order that undue wear may be avoided.

In accordance with my invention, I provide a plug valve for controlling the flow of fluids through pipes and that is arranged to be reciprocated from its seat prior to its angular adjustment and to be returned to its seat subsequent to such adjustment. It is desirable that the mechanism for controlling a valve of this type be as simple and as rugged as possible and that a unitary mechanism be employed for the operation of the valve.

In the mechanism I have provided, a single reciprocating device which may be power operated, controls both the longitudinal position of the valve and its angular adjustment to its open or its closed position, as the case may be. A stem that is connected to the valve plug by universal joints operates as a toggle to remove the valve from its seat and also serves to rotate the valve to its desired position.

Figure 1:
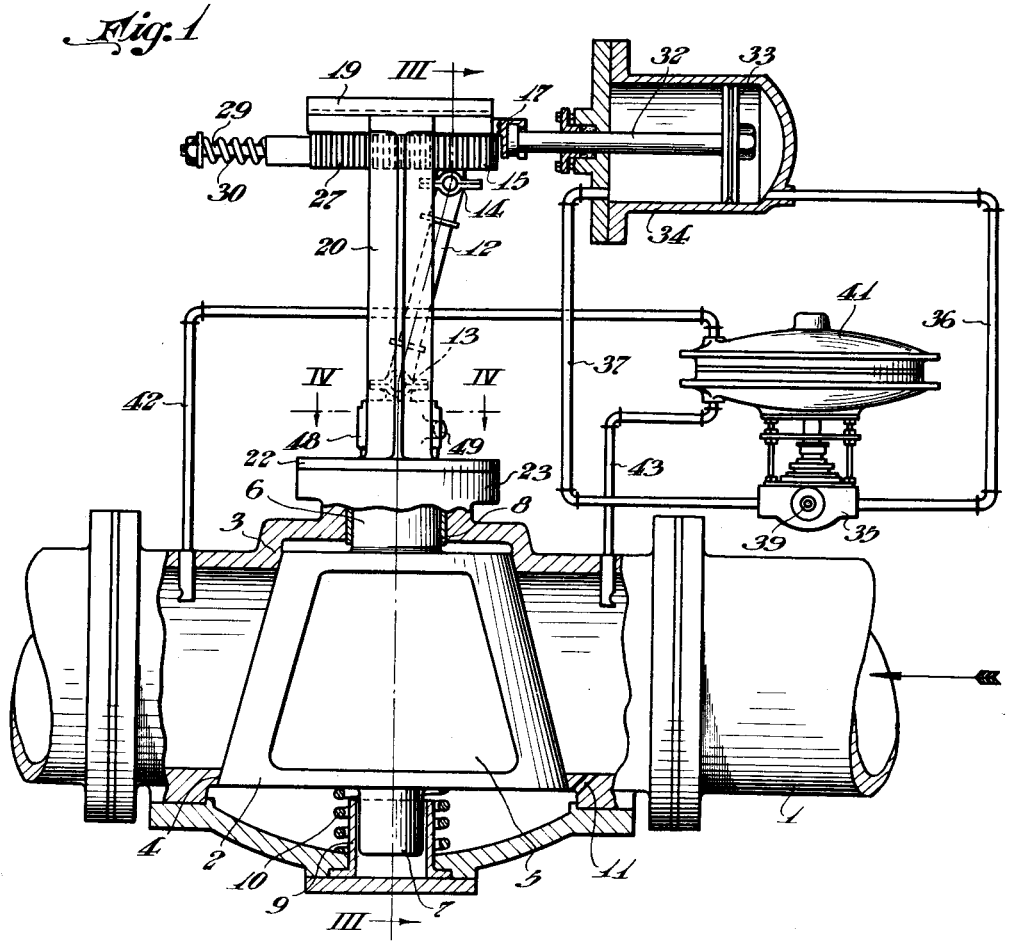
Figure 2:
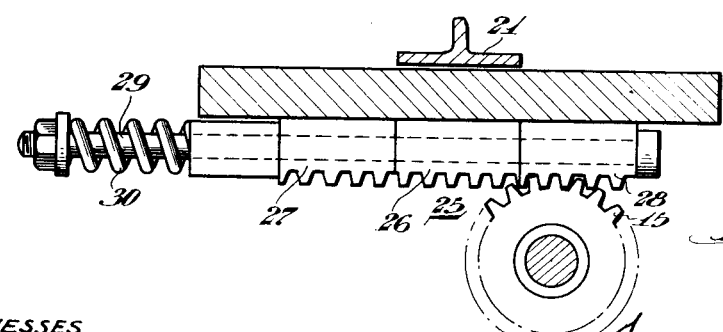

The details of my invention will be described in connection with the accompanying drawings in which Fig. 1 is a view partially in elevation and partially in section of a plug valve and its associated mechanism; Fig. 2 a horizontal section of a portion of the mechanism for reciprocating and rotating the valve stem, taken on line II—II of Fig. 3; Fig. 3 a vertical section taken on the line III—III of Fig. 1; Fig. 4 an enlarged section taken on the line IV—IV of Fig. 1; Fig. 5 an enlarged vertical section of the diaphragm-operated controlling valve of Fig. 1; Fig. 6 a horizontal section of the diaphragm-controlled plug valve of Fig. 5; Fig. 7 an elevation of a modified arrangement for operating the plug valve of Fig. 1; Fig. 8 an enlarged perspective view of the valve stem of Fig. 7 and mechanism for insuring its rotation; Fig. 9 a horizontal section taken on the line IX—IX of Fig. 7; and Fig. 10 a vertical section taken on the line X—X of Fig. 7.

Referring particularly to the preferred form of my invention illustrated in Figs. 1 to 6 inclusive, a pipe or conduit 1 for conveying fluid under pressure such, for example, as water to be supplied to a turbine, is provided with a plug valve which comprises a plug 2 of substantially frusto-conical shape that is provided with seats 3 and 4 at its upper and lower ends respectively. The plug 2 is provided with an orifice 5 which permits flow therethrough when it is adjusted in alignment with the pipe 1.

The plug 2 is mounted for reciprocation and rotation by means of short vertical cylindrical stems 6 and 7 mounted in bushings 8 and 9, respectively. A spring 10 which surrounds the bushing 9 biases the plug 2 toward its uppermost position in engagement with the seats 3 and 4. An aperture 11 in the seat 4 and a loose fit of the stem 7 in the bushing 9 permits unbalanced fluid pressure to press the plug upwardly.

A valve stem 12 is connected at its lower end by means of a universal joint 13 to stem 6 and is connected at its upper end by means of a universal joint 14 to a pinion 15. The pinion 15 is provided with a central opening to receive a boss or projection 16 that is integral with a cross head 17 mounted in a dove-tail slot 18 for reciprocation in a guideway 19. The latter is supported by two vertical standards 20 and 21 that are integral with a collar 22 secured to the valve casing 23 as shown in Figs. 1 and 3.

As shown in enlarged detail in Fig. 2 a rack 25 secured to the guideway 19 is provided with a central fixed section 26 and two movable end sections 27 and 28 that are mounted on a rod 29 for reciprocation. A spring 30 tends to retain the movable sections 27 and 28 in the position in which they are illustrated in Fig. 2.

The crosshead 17 and the pinion 15 are actuated by means of a piston rod 32 and a piston 33 of a fluid-pressure cylinder 34.

The operation of the piston 33 of the fluid-pressure cylinder 34 is controlled by a relatively small four-way plug valve 35 the details of the connection of which are shown in Fig. 6. The valve 35 is connected by means of pipes 36 and 37 to opposite ends of the cylinder 34. A third pipe 38 is connected to any suitable source of fluid pressure (not shown). A fourth pipe 39 constitutes an exhaust line.

The valve 35 is controlled by a diaphragm mechanism 41, the latter being in turn controlled by fluid pressure transmitted thereto by an upper pipe 42 and a lower pipe 43 that are connected to the pipe 1 at opposite sides of the plug 2.

The details of the diaphragm mechanism 41 and its mechanical connections to the four-way valve 35 are best shown in Fig. 5. The diaphragm 44 which may be of any suitable flexible material is reinforced and weighted at its central portion by metallic discs 45 and has axially connected thereto a hollow internally screw-threaded shaft 46 cooperating with a rotatable screw-threaded shaft 47 that is connected to the four-way valve 35. The threads of the cooperating shafts 46 and 47 are relatively steep and of the quick-acting type such as those employed in screw drivers or similar mechanisms whereby vertical movements of the diaphragm 44 and hollow shaft 46 cause rotation of the shaft 47 and the valve 35.

In the operation of the preferred form of my invention described above it may be assumed that the weighted diaphragm 44 is in its lowermost position in which the plug 2 is in its closed position and that fluid pressure is supplied to the pipe 1 in the direction of the arrow in Fig. 1. Pressure is transmitted through the pipe 43 to the lower side of the diaphragm 44 and the latter together with the hollow shaft 46 rises to rotate the shaft 47 and the plug valve 35 connected thereto.

The valve 35 is rotated to its position illustrated in Fig. 6 to admit fluid under pressure from the pipe 38 to the pipe 36 whereupon the piston 33 and its rod 32 are actuated to the left as viewed in Fig. 1 to move the pinion 15 from its illustrated position to the left. The rack section 28 which is in its extreme right-hand position moves to the left with the pinion 15 without rotating the latter until it reaches the position shown in Fig. 2 in which the rack sections 28 and 26 are in engagement.

This movement of the pinion 15 which is connected to the cross-head 17 causes the stem 12 to operate as a toggle to depress the plug 2 against the force of the spring 10 to unseat the valve 2 as will be readily understood.

Further movement of the pinion 15 to the left causes it to engage the fixed rack section 26 and the pinion rotates through an angle of approximately 90° to correspondingly rotate the stem 12 and plug 2 while the latter is in its depressed position.

The pinion 15 next engages the movable rack section 27 and these parts then move to the left without rotation of the pinion, the spring 30 being compressed upon the rod 29 during the latter portion of the travel of the pinion 15. The stem 12 has now released its pressure against the plug 2 and unbalanced fluid pressure and the spring 10 now cause the latter to be again seated. The plug valve is now in its open position and liquid may be transmitted through the pipe 1 without any obstruction other than that of the opening 5 through the valve body.

When the pump for supplying liquid to the pipe 1 is stopped, pressure on the pipes 42 and 43 may be equalized or if there is a reverse head of liquid the pressure in pipe 42 exceeds that of pipe 43. In either event the weighted diaphragm 44 is depressed and the controlling plug valve 35 is caused to reverse its position and to connect the pipes 38 and 37 to supply fluid pressure to the latter and to permit the flow of fluid under pressure from the pipe 36 to the exhaust line 39.

The piston 33 is then actuated from its left-hand position to the position in which it is shown in Fig. 1 to reverse the operation of the mechanism for controlling the plug valve 2. In the return movement of the piston 33 and the cross-head 17 the movable section 27 of the rack moves to the right with the pinion 15 without rotation of the latter until the section 27 engages the fixed section 26. This movement of the pinion 15 causes the stem 12 to again operate as a toggle to remove the plug 2 from its seat prior to its rotation to its closed position.

Upon the pinion 15 engaging the fixed rack section 26 the pinion is rotated through an angle of approximately 90° to rotate the plug to a position in which its opening 5 is at right angles to the axis of pipe 1. Further movement of the pinion 15 to the right causes the movable rack section 28 to move with it without rotation of the pinion, and the toggle constituted by the stem 12 releases the pressure on the plug 2 and unbalanced fluid pressure and the spring 10 return the plug 2 to its seated position with the valve closed.

As shown in Fig. 4 the angle of rotation of the plug 2 is limited by means of a collar 48 mounted on the stem 12 and provided with a projection 49 which coacts with stops 50 respectively located upon the standards 20 and 21.

Reference will now be had to Figs. 7 to 10, inclusive, in which a modified construction of the operating mechanism is illustrated. Similar numerals are used to designate parts similar to those of the preferred embodiment.

In the modification, a plug valve, the details of which are not illustrated but which correspond to those of the valve of Fig. 1, is provided with a stem 51 having a square portion 52 at each end thereof respectively loosely mounted in a socket 53 connected to the plug valve and to a socket 54 connected to the pinion 15.

A framework 55 provides a guideway for a rack 56 that is adapted to be reciprocated by the piston rod 57 of a fluid-pressure cylinder 58. The stem 51 is provided with a block 59 having a recess 60 therein the sides of which are substantially at right angles to each other. The block 59 is adapted to slide upon the surface of a bar 62 constituting a guideway therefor except when the block registers with a notch 63 in the bar 62. A cross bar 64 of the framework 55 is provided with a horizontally projecting pin 65 which is adapted to cooperate with the sides of the recess 60 of the block 59 in a manner to be described.

It may be assumed that the admission of fluid pressure to the cylinder 58 is controlled in any suitable manner such for example as by the diaphragm mechanism of Fig. 1. It may be assumed also that the pinion 15 is in its extreme right-hand position with the block 59 in engagement with the bar 62.

When the piston rod 57 is actuated to the left as viewed in Fig. 7 the rack 56 actuates the pinion 15 without rotation until the several parts are in the positions illustrated in Figs. 7 and 9. The block 59 has now reached a position in which one side of the recess 60 engages the pin 65 to prevent further reciprocating movement of the block 59 and the latter now registers approximately with the notch 63.

Further movement of the piston 57 and the rack 56 causes the block 59 to rotate in a clockwise direction around the pin 65 as a fulcrum, the recess 63 permitting such rotation. The block 59 and the pinion 15 connected thereto rotate through an angle of approximately 90° until the opposite side of the recess 60 of the block 59 is in engagement with the pin 65 whereupon rotation ceases and the block 59 and the pinion 15 reciprocate to the left with the lower side of the block 59 in engagement with the guideway 62.

During the movement of the rack 56 and pinion 15 as described above the stem 51 has initially operated as a toggle to unseat the valve in the manner described in connection with the preferred embodiment prior to the rotation of the valve by means of the pinion and during the latter portion of the movement the toggle action of the stem 51 is reversed and the valve has been returned to its seat, the cycle of operation of the valve being the same as that described for the preferred form of construction.

The toggle action of the stem 51 is secured by a horizontally movable crosshead 66 which limits the upward movement of the pinion 15. The crosshead 66 is prevented from upward movement by a tongue 68 extending into a groove 69 on one side thereof and by a bar 70 on the other side. The crosshead 66 is connected to the pinion for horizontal movement therewith by means of a vertically removable member 71.

The valve is returned to its former position when fluid pressure is admitted either automatically or manually to the cylinder 58 to return the piston rod 57 and the rack 56 to the right, whereupon the cycle of operation is reversed as will be readily understood. It will be noted that the block 59 and the recess 63 are symmetrical in order that operation in either direction may occur with equal facility.

In either of the forms of apparatus embodying my invention, the operation may be controlled manually if so desired either by suitable arrangement for the admission of fluid pressure to the diaphragm or by the manual operation of the piston rod for controlling the position of the pinion 15 and the corresponding position of the valve plug 2. The four-way valve 35 may be actuated in any suitable manner as by a solenoid, a fluid-pressure cylinder or a spring.

From the foregoing it will be noted that I have provided simple and effective means for successively unseating a plug valve, rotating it to a desired position, and then seating the valve with a substantially continuous operation of unitary means for controlling it.

The foregoing and other advantages may be apparent to those skilled in the art of constructing and operating plug valves.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. A valve mechanism comprising a substantially frusto-conical valve plug, a seat therefor, and unitary means for successively reciprocating and rotating said plug, said unitary means comprising a stem for rotating said plug and having a universal joint therein for permitting lateral movement of said stem relative to said plug.

2. A valve mechanism comprising a substantially frusto-conical valve plug, a seat therefor, and unitary means for successively reciprocating and rotating said plug, said unitary means comprising a stem for said plug that is laterally movable relatively thereto, a pinion on said stem, and a rack that is movable relatively to said pinion for cooperation therewith.

3. A plug valve comprising a tapered valve plug, a seat therefor, and unitary means for successively moving said plug from its seat, rotating it, and returning it to its seat, said means comprising a pinion having universal joint connections to said plug, and rack means movable with said pinion bodily and for rotating said pinion.

4. A plug valve comprising a tapered plug, a seat therefor, and unitary means for successively moving said plug from its seat, rotating it and returning it to its seat, said means comprising a pinion having universal joint connections to said plug, a rack having movable and fixed sections for cooperating successively with said pinion, and means for moving said pinion bodily.

5. A plug valve comprising a tapered valve plug, a seat therefor, and unitary means for successively moving said plug from its seat, rotating it and returning it to its seat, said means comprising a pinion having universal joint connections to said plug, a rack having two movable sections and a relatively fixed section therebetween, and means for actuating said pinion bodily but permitting its rotation by said fixed section.

6. A plug valve comprising a plug having a seat, means for biasing said plug against said seat, and means for controlling the axial and angular positions of said plug, said means comprising a stem having a universal joint connection to said plug, means for actuating said stem laterally, and means for rotating said stem during a portion of said lateral movement.

7. A plug valve comprising a plug having a seat, means for biasing said plug against said seat, and means for controlling the axial and angular positions of said plug, said means comprising a stem having a universal joint connection to said plug, means for actuating said stem laterally to cause it to act as a toggle, and means for rotating said stem during a portion of said lateral movement, the rotating means comprising a pinion on said stem, and a rack movable relatively thereto during the rotation of said stem.

8. A plug valve comprising a valve body having a seat, means for biasing said valve body against said seat, and means for controlling the axial and angular positions of said valve body, said means comprising a stem having a universal joint connection to said valve body, means for actuating said stem laterally and for rotating it, the actuating means comprising a reciprocable rack for moving said pinion bodily without rotation during a portion of its reciprocation, and means for restraining said pinion against movement bodily during an intermediate portion of the movement of said rack for effecting rotation of said pinion.

JEROME A. BOLAND.